(12) United States Patent
Karlsson et al.

(10) Patent No.: US 6,470,192 B1
(45) Date of Patent: Oct. 22, 2002

(54) METHOD OF AN APPARATUS FOR BEAM REDUCTION AND COMBINING IN A RADIO COMMUNICATIONS SYSTEM

(75) Inventors: Berth Jonas Karlsson, Kista; Ulf Goran Forseen, Saltsjo-Boo, both of (SE)

(73) Assignee: Telefonaktiebolaget LM Ericcson (publ), Stockholm (SE)

( * ) Notice: Subject to any disclaimer, the term of this patent is extended or adjusted under 35 U.S.C. 154(b) by 0 days.

(21) Appl. No.: 09/374,265

(22) Filed: Aug. 16, 1999

(51) Int. Cl.⁷ .............................. H04B 1/38; H04M 1/00
(52) U.S. Cl. ..................... 455/561; 455/562; 455/25
(58) Field of Search ................................. 455/561, 562, 455/25, 276.1, 277.2, 273, 279.1

(56) References Cited

U.S. PATENT DOCUMENTS

| | | |
|---|---|---|
| 4,644,562 A | 2/1987 | Kavehrad et al. |
| 4,713,817 A | 12/1987 | Wei |
| 4,752,968 A | 6/1988 | Lindenmeier et al. |
| 4,992,798 A | 2/1991 | Nozue et al. |
| 5,031,193 A | 7/1991 | Atkinson et al. |
| 5,048,059 A | 9/1991 | Dent |
| 5,155,744 A | 10/1992 | Ringelhaan |
| 5,164,961 A | 11/1992 | Gudmundson |
| 5,191,598 A | 3/1993 | Backstrom et al. |
| 5,204,979 A | 4/1993 | Schenkyr et al. |
| 5,319,677 A | 6/1994 | Kim |
| 5,351,274 A | 9/1994 | Chennakeshu et al. |
| 5,425,059 A | 6/1995 | Tsujimoto |
| 5,481,572 A | 1/1996 | Skold |
| 5,485,631 A | 1/1996 | Bruckert |
| 5,487,091 A | 1/1996 | Jasper et al. |
| 5,491,723 A | 2/1996 | Diepstraten |
| 5,509,014 A | 4/1996 | Utting |
| 5,680,419 A | 10/1997 | Bottomley |
| 5,684,491 A | 11/1997 | Newman et al. |
| 5,884,192 A | 3/1999 | Karlsson et al. |
| 5,924,020 A | * 7/1999 | Forssen et al. ............. 342/373 |

FOREIGN PATENT DOCUMENTS

| | | | |
|---|---|---|---|
| EP | 0 425 458 A1 | 5/1991 | |
| EP | 54 3328 A1 | 11/1992 | |
| EP | 0817308 | 1/1998 | |
| EP | 0 817 308 A2 | 7/1998 | |
| IT | 0 817 308 A2 * | 1/1998 | ............ H01Q/3/26 |
| WO | 93/12590 | 6/1993 | |
| WO | 97/40588 | 10/1997 | |
| WO | WO 97/40588 A1 * | 10/1997 | ............ H04B/7/08 |

OTHER PUBLICATIONS

Ulf Forssen et al., "Adaptive Antenna Arrays for GSM900/DCS1800", 1994 IEEE 44$^{th}$ Vehicular Technology Conference, Jun., 1994, pp 1–723.

(List continued on next page.)

*Primary Examiner*—Dwayne Bost
*Assistant Examiner*—G West
(74) *Attorney, Agent, or Firm*—Burns, Doane, Swecker & Mathis, L.L.P.

(57) ABSTRACT

Recently, interference rejection combining techniques have been proposed which can significantly increase the performance of the uplink in C/I limited environments. However, as with many signal processing techniques, calculation complexity can be performance issue. Thus, according to exemplary embodiments of the present invention, the noise cross-correlation matrix used in interference rejection combining is reduced by applying beamforming and signal combining techniques. In this way, the benefits of interference rejection combining are obtained while reducing the processing complexity and freeing processor resources for other activities.

34 Claims, 2 Drawing Sheets-

OTHER PUBLICATIONS

J. H. Winters, "Signal Acquistion And Tracking With Adaptive Arrays In the Digital Mobile Radio System IS–54 With Flat Fading", IEEE Trans. Veh. Technol., vol. 42, pp 377–384, Nov. 1993.

A.P. Clark and S. Hariharan, "Adaptive Channel Estimator For An HF Radio Link", IEEE Trans. Commun., vol. 37, pp. 918–926, Sep. 1989.

G.D'Aria, R. Piermarini and V. Zingarelli, "Fast Adaptive Equalizers For Narrow–Band TDMA Mobile Radio", IEEE Trans. Veh. Technol., vol. 40, pp. 392–404, May 1991.

Forney, "The Viterbi Algorithm", Proc. IEEE, vol. 61, pp. 286–296, Mar. 1973.

J. H. Winters, "Optimum Combining In Digital Mobile Radio With Cochannel Interference", IEEE J. Sel. Areas Commun., vol. SAC–2, pp. 528–539, Jul. 1984.

J. H. Winters, "Optimum Combining In Digital Mobile Radio With Cochannel Interference", Trans. Veh. Technol., vol. VT–33, pp. 144–155, Aug. 1984.

J. H. Winters, "On The Capacity Of Radio Communication Systems With Diversity In A Rayleigh Fading Environment", IEEE J. Sel. Areas Commun., vol. SAC–5, pp. 871–878, Jun. 1987.

J. H. Winters, "Optimum Combining For Indoor Radio Systems With Multiple Users", IEEE Trans. Commun., vol. COM–35, pp. 1222–1230, Nov. 1987.

P. Balaban and J. Salz, "Dual Diversity Combining And Equalization In Digital Cellular Mobile Radio", IEEE Trans. Veh. Technol., vol. 40, pp. 342–354, May 1991.

S.A. Hanna, M. El–Tanany, and S. A. Mahmoud, "An Adaptive Combiner for Co–Channel Interference Reduction In Multi–User Indoor Radio Systems", Proc. IEEE Veh. Technol. Conf., St. Louis, MO, May 19–22, 1991, pp. 222–227.

J. H. Winters, J. Salz, and R. D. Gitlin, "The Capacity Increase Of Wireless Communication Systems With Antenna Diversity", Proc. 1992 Conf. Inform. Sciences Syst., vol. II, Princeton, NJ, Mar. 18–20, 1992, pp. 853–858.

P. Balaban and J. Salz, "Optimum Diversity Combining And Equalization In Digital Data Transmission With Applications To Cellular Mobile Radio—Part I: Theoretical Considerations", IEEE Trans. Commun., vol. 40, pp. 885–894.

J. H. Winters, J. Salz and R. D. Gitlin, "The Capacity of Wireless Communication Systems Can Be Substantially Increased By The Use of Antenna Diversity", $1^{st}$ Intl. Conf. on Universal Personal Communications (ICUPC '92), Sept. 29–Oct. 2, 1992, Dallas, TX, pp. 02.01.1–02.01.5.

M. V. Clark, L. J. Greenstein, W. K. Kennedy, and M. Shafi, "Optimum Linear Diversity Receivers In Digital Cellular Radio", Proc. Third International Symposium On Personal, Indoor, and Mobile Radio Communications, Boston, MA, Oct. 19–21, 1992.

J. H. Winters, "Signal Acquistion And Tracking With Adaptive Arrays In Wireless Systems", Proc. 43rd IEEE Veh. Technol. Conf., Secaucus, NJ 1993, pp. 85–88.

J. H. Winters, J. Salz, and R. D. Gitlin, "The Impact Of Antenna Diversity On The Capacity Of Wireless Communication Systems", IEEE Trans. Commun., vol. 42, pp. 1740–1751, Feb./Mar./Apr. 1994.

D. W. Tufts and A. A. Shah, "Rapid Interference Suppression And Channel Identification For Digital, Multipath Wireless Channels", Proc. 44th IEEE Veh. Technol. Conf., Stockholm, Sweden, Jun. 7–10, 1994, pp. 1241–1245.

S. Simanapalli, "Adaptive Array Methods For Mobile Communications", Proc. 44th IEEE Veh. Technol. Conf., Stockholm, Sweden, Jun. 7–10, pp. 1503–1506.

W. H. Sheen and G. L. Stuber, "MLSE Equalization And Decoding For Multipath–Fading Channels", IEEE Trans. Commun. vol. 39, No. 10, Oct. 1991.

Q. Liu and Y. Wan, "An Adaptive Maximum–Likelihood Sequence Estimation Receiver With Dual Diversity Combining/Selection", Int. Symp. On Personal, Indoor And Mobile Radio Commun., Boston, MA, pp. 245–249, Oct. 19–21, 1992.

Q. Liu and Y. Wan, "A Unified MLSE Detection Technique For TDMA Digital Cellular Radio", 43rd IEEE Vehicular Technology Conference, Secaucus, NJ, pp. 265–268, May 18–20, 1993.

P. Monsen, "Theoretical And Measured Performance Of A DFE Modem On A Fading Multipath Channel", IEEE Trans. Commun., vol. COM–25, pp. 1144–1153, Oct. 1977.

P.Monsen, "Feedback Equalization For Fading Dispersive Channels", IEEE Trans. Info. Theory, vol. IT–17, pp. 56–64, Jan. 1981.

P. Monsen, "MMSE Equalization Of Interference On Fading Diversity Channels", IEEE Trans. Commun. vol. COM–32, No. 1, pp. 5–12, Jan. 1984.

G. Ungerboeck, "Adaptive Maxium–Likelihood Receiver For Carrier–Modulated Data–Transmission Systems", IEEE Trans. Commun., vol. COM–22, pp. 624–635, May 1974.

W. Van Etten, "Maximum Likelihood Receiver For Multiple Channel Transmission Systems", IEEE Trans. Commun., vol. COM–24, pp. 276–283, Feb. 1976.

"Free From Sample Timing And Input Level Controls", Secaucus, NJ, May 18–20, 1993, No. Conf. 43, May 18, 1993, Institute of Electrical and Electronics Engineers, pp. 408–411, XP000393208, Kazuhiro Okanoue et al.

N. W. K. Lo, D. D. Falconer and A. U. H. Sheikh, "Adaptive Equalization And Diversity Combining For A Mobile Radio Channel", Proc. IEEE Globecom '90, pp. 507A.1.1–507A.2.5, Dec. 1990.

N. W. K. Lo, D. D. Falconer and A. U. H. Skeikh, "Adaptive Equalization And Diversity Combining For Mobile Radio Using Interpolated Channel Estimates", IEEE Trans. Veh. Technol., vol. 40, pp. 636–645, Aug. 1991.

R. D. Koilpillai, S. Chennakeshu, and R. L. Toy, "Equalizer Performance With Diversity For U.S. Digital Cellular", Intl. Symp. on Personal, Indoor and Mobile Radio Commun., Boston, MA, pp. 255–259, Oct. 19–21, 1992.

B. Picinbono, "On Circularity", IEEE Trans. Sig. Proc., vol. 42, pp. 3473–3482, Dec. 1994.

G. E. Bottomley and K. Jamal, "Adaptive Arrays And MLSE Equalization", Pro. VTC '95, Chicago, IL, Jul. 1995, pp. 50–54.

Young C. Yoon and Harry Leib, "Matched Filtering In Improper Complex Noise And Application To DS–CDMA", IEEE publication No. 0–7803–3002–1/95, 1995, pp. 701–705.

W. Lee and Y. Yeu, "Polarization Diversity System For Mobile Radio", IEEE Transactions on Communications, COM–20(5), pp. 912–923, Oct. 1972.

S. Kozono, T. Tsuruhara, and M. Sakamotot, "Base Station Polarization Diversity Reception For Mobile Radio", IEEE Transactions on Vehicular Technology, 33(4), pp. 301–306, 1978.

A. Baier, G. Heinrich, and U. Wellens, "Bit Synchronization And Timing Sensitivity In Adaptive Viterbi Equalizers For Narrowband–TDMA Digital Mobile Radio Systems", Proc. VTC '88, Philadelphia, PA, pp. 377–384, 1988.

M. V. Clark, L. J. Greenstein, W. K. Kennedy, and M. Shafi, "Optimum Linear Diversity Receivers For Mobile Communications", IEEE Trans. Veh. Technol., vol. 43, pp. 47–56, Feb. 1994.

J. Salz and J. H. Winters, "Effect Of Fading Correlation On Adaptive Arrays In Digital Mobile Radio", IEEE Trans. Veh. Technol., vol. 43, pp. 1049–1057, Nov. 1994.

J. Modestino, Integrated Multielement Receiver Structures for Spatially Distributed Interference Channels, IEEE Trans. on Information Theory, vol . IT–32, No. 2, Mar. 1986.

* cited by examiner

METHOD OF AN APPARATUS FOR BEAM REDUCTION AND COMBINING IN A RADIO COMMUNICATIONS SYSTEM

FIELD OF THE INVENTION

The present invention relates to radio communications in general, and more specifically, to a method of, and apparatus for, providing beam reduction for a signal combining base station in a radio communication system.

BACKGROUND

In a digital cellular radio communication system, radio signals which are digitally modulated are used to convey information between radio base stations and mobile stations. The radio base stations transmit downlink signals to the mobile stations and receive uplink signals transmitted by the mobile stations. A common problem that occurs in digital cellular radio communication systems is the loss of information in the uplink and downlink signals as a result of multipath fading and interference which may exist in the radio transmission channel.

With regard to multipath fading, there are basically two effects: fading and time dispersion. When the path length between a mobile station and a base station is relatively short, fading arises from the interaction of the transmitted signal, or main ray, and reflections thereof, or echoes, which arrive at the receiver at approximately the same time. When this occurs, the main ray and echoes add either destructively or constructively. If there are a large number of echoes, the pattern of destructive and constructive addition takes on a Rayleigh distribution, which is why this effect is sometimes called "Rayleigh fading". Where destructive addition results in fading "dips", the received signal generally exhibits a relatively low carrier-to-noise (C/N) characteristic.

The effects of fading dips can be mitigated by having multiple receive antennas and by employing some form of diversity combining, such as selective combining, equal gain combining, or maximal ratio combining, wherein signals from each receive antenna are combined to create a single received signal. Diversity techniques take advantage of the fact that the fading on the different antennas is not the same, so that when one antenna receives a fading dip, chances are, another antenna is not. Note Mobile Communications Design Fundamentals by William C. Y. Lee, Howard W. Sams & Co., Ind., USA. In section 3.5.1 of this book, several examples are given describing how signals from two receiver amplifiers with separate antennas can be combined to counteract fading.

For longer path lengths, time dispersion occurs when the echoes are delayed with respect to the main ray. If an echo of sufficient magnitude arrives at the receiver delayed from the main ray by an amount of time on the order of the symbol period, time dispersion gives rise to intersymbol interference (ISI). Time dispersion may be advantageously corrected by using an equalizer. In the case of digital signal modulation, a maximum likelihood sequence estimation (MLSE) equalizer such as described in Digital Communications, $2^{nd}$ Ed., by John G. Proakis, Mc-Graw Hill Book Company, New York, N.Y. USA, 1989 may be used. In section 6.7 of this book, various methods are described for detecting signals corrupted by time dispersion, or inter-symbol interference (ISI), using MLSE equalization.

There may also exist signal sources in the radio environment which are not orthogonal to the desired signal. Non-orthogonal signals, or interference, often come from radios operating on the same frequency (i.e., co-channel interference) or from radios operating on neighboring frequency bands (i.e., adjacent-channel interference). Of course, non-orthogonal signals can have a detrimental affect on the carrier-to-interference ration (C/I) of another channel. When the carrier-to-interference ratio (C/I) of a channel is too low, the quality of voice output at the mobile station is poor. Many techniques have been developed in order to minimize interference to tolerable levels including frequency re-use patterns, frequency hopping and adaptive beamforming, wherein the latter is generally used to steer a null in an antenna pattern in the direction of an interferer.

More recently, methods have been proposed that partially solve the problems of multipath fading and interference. In U.S. Pat. No. 5,191,598 to Bäckstrom, et al., for example, the problem of accurately detecting signals in the presence of fading and time dispersion is overcome by using a Viterbi-algorithm having a transmission function estimated for each antenna. By reference thereto, U.S. Pat. 5,191,598 is incorporated herein in its entirety. Another method of accurately detecting signals in the presence of fading and interference was presented in the IEEE Transactions on Vehicular Technology, Vol. 42, No. 4, November 1993, J. H. Winters: "Signal Acquisition and Tracking with Adaptive Arrays in the Digital Mobile Radio System IS-54 with Flat Fading".

Although the above described conventional techniques can be used to improve signal quality, there remains room for improvement. Thus, in one of the related applications, interference rejection combining (IRC) techniques are described which combat interference, for example, using impairment correlations to improve the maximum likelihood sequence estimation. However, the use of impairment correlations in this way may be mathematically complex and may require significant processor resources. Accordingly, it would be desirable to reduce the calculation complexity while preserving the useful qualities of interference rejection combining.

SUMMARY

In accordance with one aspect of the present invention, beamforming and signal combining techniques can be used in conjunction with IRC techniques to reduce the overall complexity of processing received signals. According to one exemplary embodiment of the present invention, signals transmitted from mobile stations are received by an array of antenna elements at a base station. The received signals are combined in a beamforming device, for example a Butler matrix. The outputs of the beamforming device correspond to a plurality of beams which cover an entire cell supported by the base station. The number of beams formed can be smaller than the number of antenna elements, which reduces the complexity of processing within the receiver. Each output of the beamforming device is connected to a radio receiver which converts the RF signal to baseband. Other quality improvement processing functions, including locating the training sequence, estimating the channel impulse response and other quality measures, for example measuring signal strength, noise power and carrier to interference ratio, are then performed. Thereafter, a certain number of received signal branches are selected based upon the estimated quality parameters. This further reduces complexity at the receiver, which performs interference rejection combining on the selected branches.

According to another exemplary embodiment, two or more antenna arrays can be employed to obtain further diversity against fading radio signals. Diversity techniques including, for example, spatial diversity or polarization diversity, can be employed. Like the first described exemplary embodiment, beamforming is also employed to further reduce complexity.

BRIEF DESCRIPTION OF THE DRAWINGS

Exemplary embodiments of the present invention will now be described in more detail with reference to the accompanying drawings, in which like descriptive labels are used to refer to similar elements.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention with unnecessary detail.

Figure 1:
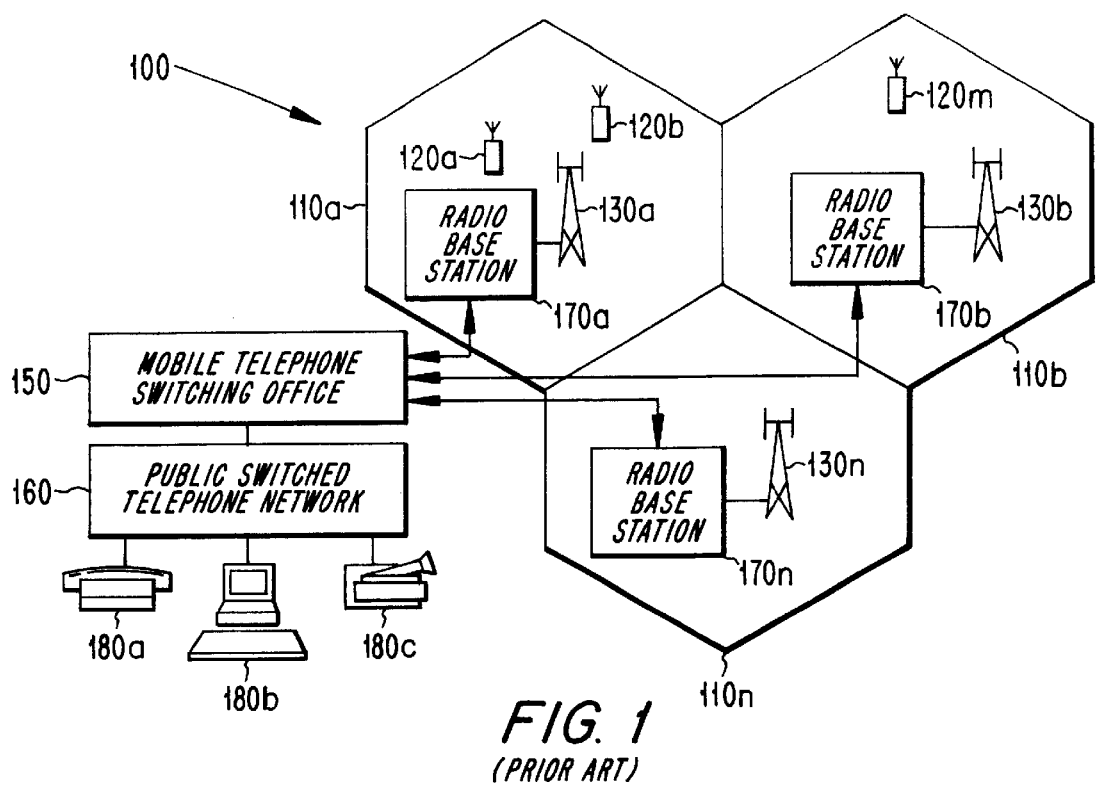
FIG. 1 illustrates an exemplary cellular radio communication system.

An exemplary cellular radio communication system 100 is generally illustrated in FIG. 1. A geographic region served by the system 100 may be subdivided into a number, n, of smaller regions of radio coverage known as cells 110a–n, each cell 110a–n having associated with it a respective radio base station 170a–n. Each radio base station 170a–n has associated with it an antenna system 130a–n where inter alia the transmit and receive antennas are located. The use of hexagonally-shaped cells 110a–n is a graphically convenient way of illustrating areas of radio coverage associated with base stations 170a–n respectively. In actuality, cells 110a–n may be irregularly shaped, overlapping, and not necessarily contiguous. Sectorization within cells 110a–n is also possible and contemplated by the present invention.

Distributed within cells 110a–n are a plurality of mobile stations 120a–m. Base stations 170a–n provide two-way radio communication with mobile stations 120a–m located within corresponding cells 110a–n respectively. Generally, the number, m, of mobile stations is vastly greater than the number, n, of radio base stations. Radio base stations 170a–n are coupled to the mobile telephone switching office (MTSO) 150 which provides inter alia a connection to the public switched telephone network (PSTN) 160 which, in turn, provides connections to communication devices 180a–c. This basic cellular radiocommunication concept is known in the art and will not be described further.

Figure 2:
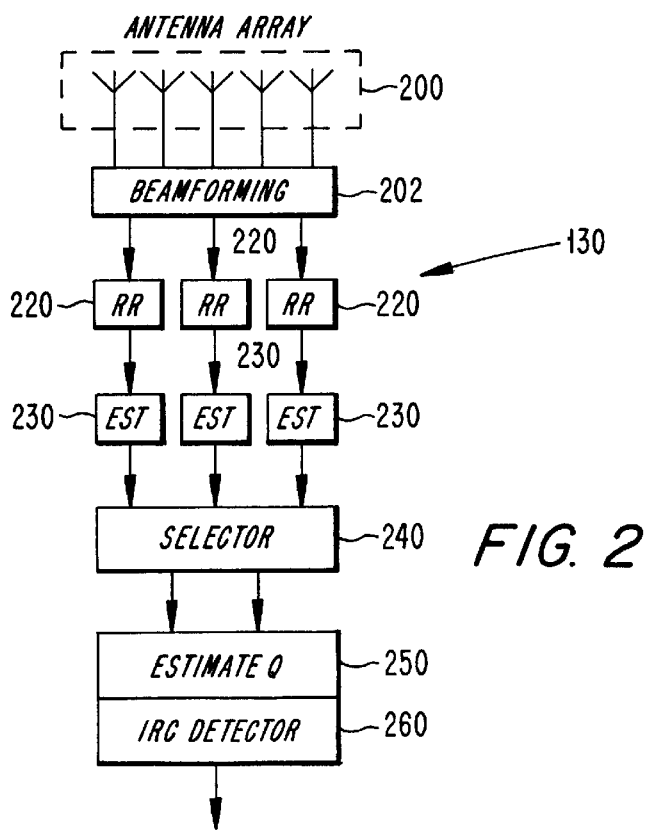
FIG. 2 illustrates a base station according to a first exemplary embodiment of the present invention.
Figure 3:
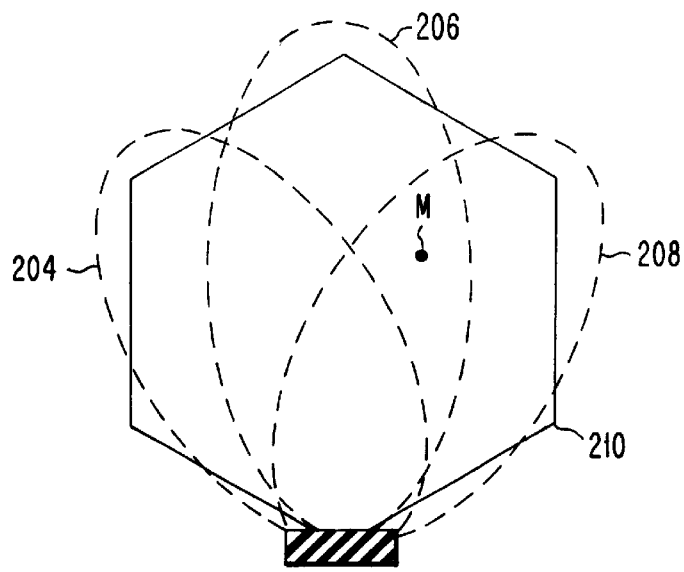
FIG. 3 depicts how fixed beams can be arranged to cover a cell.

A base station 130 with an array antenna system, according to an exemplary embodiment of the present invention, is illustrated in FIG. 2. Therein, signals transmitted from mobile stations are received by the array of antenna elements 200. The array 200 includes m number of elements. In the example illustrated in FIG. 2, m is five. The received signals are then forwarded to and combined in a fixed beamforming device 202, e.g., a Butler matrix. The outputs of the beamformer 202 correspond to r narrow beams that cover the entire cell supported by base station 130. For example, FIG. 3 illustrates three beams 204, 206 and 208 which provide coverage of cell 210. The principle behind beamforming, as it is used in the context of signal reception, is that transmissions from a particular mobile station will be received in less than all of a base station's beams. For example, a mobile located at point M in FIG. 3 may contribute relevant information received on beams 206 and 208, but not on beam 204. Thus, the processing of the received signals can be simplified vis-a-vis mobile M by disregarding beam 204. The number of formed beams, r, can be smaller than the number of antenna elements, m, which is another way to reduce the complexity of the receiver and to adjust the coverage area associated with the cell 210. Note that although the fixed beamforming is illustrated in FIG. 2 as being performed at RF, it can instead be performed at baseband.

Each beam's output from the beamformer 202 is connected to a radio receiver 220 which converts the RF signal to baseband. The estimation blocks 230 locate the training sequence, estimate the channel impulse response and perform other quality measurements, e.g., measurements of signal strength, noise power and C/I. Thereafter, the selector 240 selects the p best branches with respect to some of the estimated quality measures. The choice of p is a tradeoff between complexity and performance. In this example, p is chosen to be two. The selection of the p best branches can be memoryless or can take into account previous measurements as well.

The symbol detection is then performed with a multidimensional detector, e.g., a multidimensional Maximum Likelihood Sequence Estimator, that suppresses the interferers. The suppression process starts with estimation of the noise cross-correlation matrix Q at block 250. The noise includes, for example, thermal noise and co-channel interference. If the cellular system conforms to the GSM standard and the base stations are synchronized, then it is sufficient to estimate the noise cross-correlation matrix during the training sequence. Otherwise, if the base stations are not synchronized or the IS-136 (or PDC) standard is used, the noise cross-correlation matrix Q should be periodically estimated during the time slot.

In GSM, the radio channel will stay nearly constant during one time slot for all normal mobile station velocities. This implies that channel estimates H will be constant during a time slot and that the noise cross-correlation matrix Q will not vary during a time slot. Therefore, H and Q need not be updated during the time slot which leads to a drastic reduction in complexity.

This should be compared with DAMPS in which the radio channels vary considerably during a time slot even for moderate velocities of the mobile station.

The gain from the reduced number of signals will also be greater for GSM systems due to the slower channel variation. In GSM, one can gain from not selecting a branch in which the desired signal is faded out during a whole time slot. This is a rare occurrence in DAMPS systems.

As described above, the selection of p of the r branches consists generally of selecting a number of branches from a first criterion and then selecting a smaller number of branches from the first selection of branches using a second criterion.

Interference rejection detection is then performed at block 260 to whiten the received signals using the inverse of the noise cross-correlation matrix Q. This corresponds conceptually to pointing spectral nulls towards interfering mobile stations as described in more detail below. Instead of updating the noise cross-correlation matrix, it is also possible to directly estimate and track the inverse of the noise cross-correlation matrix.

Figure 4:
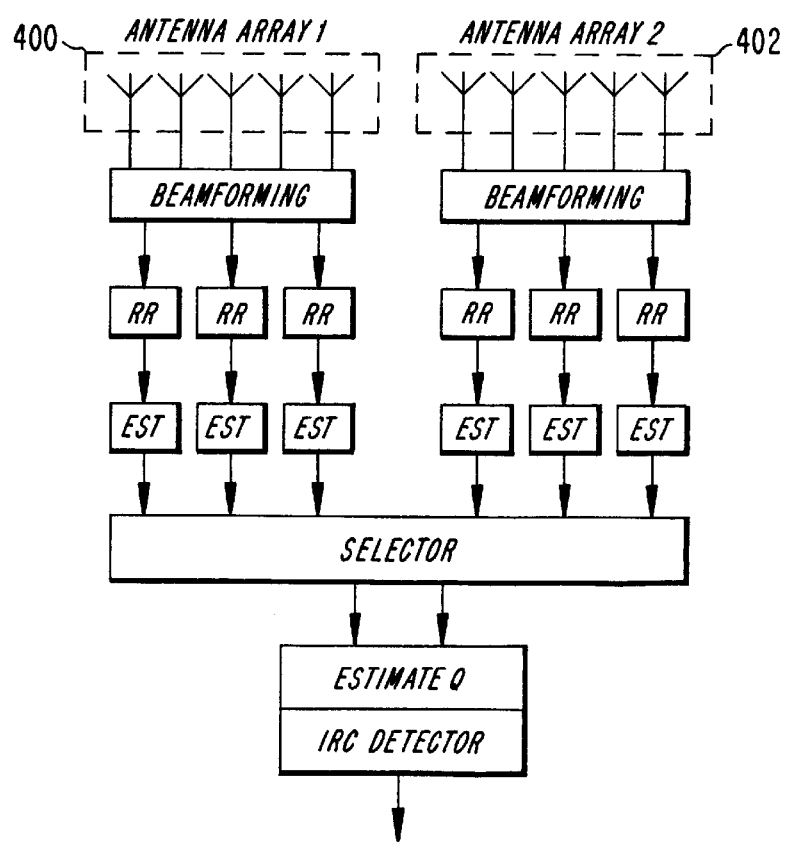
FIG. 4 illustrates a base station according to another exemplary embodiment of the present invention.

In another exemplary embodiment of the present invention, shown in FIG. 4, two antenna arrays 400 and 402 are used to achieve diversity for mitigating the effects of radio signal fading. In this figure, similar beamforming, radio receiver, estimation, selection, noise cross-correlation and IRC blocks are again shown. Since the function of these blocks has already been described above with respect to FIG. 2, reference is made to that description. The diversity antenna arrangement used could, e.g., be spatial diversity or polarization diversity which techniques are well known to those skilled in the art. Thus in the example of FIG. 4, m=10, r=6 and p=2. Furthermore, if the beamforming devices associated with the first and the second antenna arrays 400 and 402 are designed to form beams such that one beam from one of the beamforming devices always covers an area next to areas covered by beams from the other beamforming device, i.e., the beams from the two antenna arrays are interleaved, then simulations have shown that it is best to choose the same number of beams from the two antenna arrays.

Having provided a general overview of exemplary base station architectures according to the present invention, a more detailed description of the signal processing according to the present invention will now be provided, wherein the signal transmitted by a mobile station is denoted as y(t), and the radio channel from the mobile station's antenna to an antenna element of the base station antenna array is modeled as a k tap FIR-filter:

$$h_1 = [h_{11} h_{12} \ldots h_{1k}].$$

Then, let the antenna array have m elements and model the radio channel to the other antenna elements in a similar way as the first, and collect them all in the channel matrix:

$$H = [h_1^T h_2^T \ldots h_m^T]^T.$$

The colored noise that the antenna elements sense can be denoted as:

$$z(t) = [z_1(t) z_2(t) \ldots z_m(t)]^T.$$

while a vector with time delayed copies of the transmitted signal can be denoted as:

$$y(t) = [y(t) y(t-1) \ldots y(t-k+1)]^T.$$

The received signals for all m antenna elements can now be written as follows:

$$x(t) = [x_1(t) x_2(t) \ldots x_m(t)]^T = Hy(t) + z(t)$$

The beamformer matrix of block 202 then constructs r narrow beams, e.g., beams 204, 206 and 208 illustrated in FIG. 3, which can be described with an r×m matrix B. The output signals generated by the beamformer 202 are:

$$r(t) = [r_1(t) r_2(t) \ldots r_r(t)]^T = Bx(t) = BHy(t) + Bz(t)$$

The signals r(t) are the input signals to the radio receiver blocks 220, which signals are converted from RF to baseband. The baseband r(t) signals are then used to estimate the training sequence position and the channel estimate (i.e., the product BH) for each of the r branches at block 230. Some other quantities, like the signal strength, noise power and C/I, are also estimated for each branch using known techniques.

The training sequence position can, e.g., be estimated by performing a sliding correlation between the received signal and the training sequence. The channel Φ=BH can, e.g., be estimated with a least square estimate, $$\hat{\Phi} = R_{yr} R_{yy}^{-1}$$

where $R_{yy}$ is the training sequence correlation matrix and $R_{yr}$ is the cross-correlation between the received signal and the training sequence.

To further reduce the complexity of the receiver, p of r branches are selected at block 240. The selection is made based on one or more of the estimated values in the previous estimation blocks 230, e.g., the estimated C/I. The selection could also be based in part on previously stored estimation values.

In a first exemplary embodiment, the C/I is used to select the p branches by ordering the r branches according to their estimates of the C/I and to choose the p branches with the highest C/I.

In another exemplary embodiment, the p+a branches with the highest signal strength (from the estimate of C) are selected first and then from the remaining p+a branches, the p branches with the highest C/I are selected. Here, a is a natural number (i.e., 1, 2, . . . n) such that p+a<r.

Letting the p×k matrix G consist of the p selected rows of the BH matrix, and letting the p×1 vector n(t) consist of the p selected elements of the Bz(t) vector, the p selected signals can then be described as:

$$p(t) = [p_1(t) p_2(t) \ldots p_p(t)]^T = Gy(t) + n(t).$$

The new channel estimate matrix G contains the p selected row of the previous channel estimate Φ.

The next step is the estimate the noise cross-correlation matrix:

$$Q = E\{n(t)n^H(t)\}$$

This can be done by calculating the sample error cross-correlation matrix:

$$\hat{Q} = \frac{1}{N} \sum_{t=1}^{N} (p(t) - \hat{G}y(t))(p(t) - \hat{G}y(t))^H$$

A significant benefit of the present invention can be seen in the foregoing equations. By selecting only p of the r branches, the vector p becomes smaller. This, in turn, reduces the noise cross-correlation matrix Q, e.g., from an 8×8 matrix to a 3×3 or 4×4 matrix. Since Q may need to be updated very frequently, this results in significant processing reduction. If the noise is Gaussian distributed, then the MLSE solution (Maximum Likelihood Sequence Estimator) can be described as:

$$\hat{y} = \mathrm{argmin}\sum_{\tau_y} (p(t) - \hat{G}\bar{y}(t))\hat{Q}^{-1}(p(t) - \hat{G}\bar{y}(t))^H$$

This can be efficiently implemented using the Viterbi algorithm. Those skilled in the art will be familiar with Viterbi implementations which are not described in further detail here. The metric used in this case will be:

$$J = (p(t) - \hat{G}\bar{y}(t))\hat{Q}^{-1}(p(t) - \hat{G}\bar{y}(t))^H$$

Exemplary embodiments with two (or more) antenna arrays, e.g., that are shown in FIG. 4, can be described using the same mathematical framework as above, but with the difference that the beamforming matrix B now is a block matrix. For example, with two antenna arrays the beamforming matrix B may take the form:

$$B = \begin{vmatrix} B_1 & 0 \\ 0 & B_2 \end{vmatrix}$$

where $B_1$ and $B_2$ can be different sizes.

Having provided some additional details regarding the signal processing occurring in, for example, blocks 202, 220, 230, 240 and 250 of FIG. 2, a brief summary of IRC techniques performed at block 260 is provided below. For more information the interested reader is referred to the parent IRC applications. IRC techniques expand conventional diversity combining techniques to exploit the above-described correlation, whereby significant gains in the quality of the received signal are realized. The branch metrics $M_h(n)$ formed according to IRC techniques can be described by the following equation.

$$M_h(n) = [r(n) - C(n)s_h(n)]^H A(n)[r(n) - C(n)s_h(n)] = e_h^H(n) A(n) e_h(n)$$

where:

n is a time index;

$r(n) = [r_a(n), r_b(n)]$, are the signal samples received on each antenna;

$$C(n) = \begin{bmatrix} C_a(0) & \dots & C_a(n) \\ C_b(0) & \dots & C_b(n) \end{bmatrix}$$

are the channel tap estimates of the form $C_x(\tau)$ where $\tau$ is the delay, i.e., $\tau=0$ is the main ray, $\tau=1$ is the first echo, etc.;

$s_h(n) = [s_h(n), s_h(n-1) \dots ]^T$, are the hypothesized signal samples;

$z(n) = [z_a(n), z_b(n)]^T$, are the signal impairments received on each antenna;

$A(n) = R_{zz}(n)^{-1}$, or a related quantity, where $R_{zz}$ is the impairment correlation matrix which equals the expected value $E(z(n)z^H(n))$;

$e_h(n) = r(n) - C(n)s_h(n)$, is an estimate of the impairment for a given hypothesis.

The A(n) matrix (i.e., the A-matrix) is the inverse of the $R_{zz}(n)$ matrix, or a related quantity such as the adjoint or pseudo-inverse. As will be apparent to a person skilled in the art reading this application, $R_{zz}(n)$ and A(n) are specific examples of impairment correlation properties of which other forms are known. Throughout the following, the term A-matrix is used generically to refer to any estimate of the impairment correlation properties.

Determination of the A-matrix for use in the present invention can be performed in a number of ways depending upon the specific application and the required performance. The simplest approach is to use a fixed set of values for the A-matrix, stored in memory, that are never updated. These values depend primarily on the configuration of the receive antennas and on the carrier frequencies being employed. An alternative approach is to determine the A-matrix from synchronization information and to keep the A-matrix values constant between synchronization fields, or other known fields. At each new occurrence of the synchronization field, the A-matrix can be recomputed, with or without use of the previous A-matrix values. Another alternative approach is to use synchronization fields to initialize, or improve, the A-matrix values and then to use decisions made on the data field symbols to track the A-matrix values.

Also, consideration is given for the method used to track the A-matrix values. Since the A-matrix comprises information regarding the impairment correlation properties between the antennas in the antenna array, standard estimation methods for estimating correlation or inverse correlation matrices can be applied. Using either known or detected symbol values, impairment values can be obtained by taking the differences between the received signal sample streams and the hypothesized received signal sample streams. At time n, this gives a vector of impairment values, denoted z(n); one value for each antenna. A straightforward way of forming the A-matrix is given by:

$$A(n) = R_{zz}^{-1}(n)$$
$$R_{zz}(n) = \lambda R_{zz}(n-1) + Kz(n)z^H(n)$$

K is a scaling constant, typically 1 or $\sqrt{(1-\lambda)}$. Because $R_{zz}(n)$ is a Hermitian matrix, only a portion of the matrix elements need be computed.

Such a straightforward approach is fairly high in complexity. One way to reduce complexity is to apply the matrix inversion lemma and update the A-matrix directly as:

$$A(n) = \frac{1}{\lambda}\left[ A(n-1) - \left( \frac{1}{\lambda + (z(n))^H p(n)} \right) p(n) p^H(n) \right]$$

where:

$$p(n) = A(n-1)z(n)$$

Because the A-matrix is Hermitian, it is only necessary to compute those elements on the diagonal and either those elements above or below the diagonal.

These techniques for estimating and tracking the A-matrix are given only for purposes of illustration. In general, the A-matrix can be expressed and estimated in a variety of ways, as will be appreciated by a person skilled in the art who is reading this application. The present invention may also be applied to the blind equalization problem in which known synchronization sequences are absent. In this case, the A-matrix is estimated in a manner similar to how the channel is estimated.

While the present invention has been described with respect to a particular embodiment, those skilled in the art will recognize that the present invention is not limited to the specific embodiments described and illustrated herein. Different embodiments and adaptations besides those shown and described as well as many variations, modifications and equivalent arrangements will now be reasonably suggested by the foregoing specification and drawings without departing from the substance or scope of the invention. While the present invention has been described herein in detail in relation to its preferred embodiments, it is to be understood that this disclosure is only illustrative and exemplary of the present invention and is merely for the purposes of providing a full and enabling disclosure of the invention. Accordingly, it is intended that the invention be limited only by the spirit and scope of the claims appended hereto.

What is claimed is:

1. In a communications system for transmitting information symbols, a base station comprising:

an antenna array for receiving an uplink radio signal, said antenna array including at least two antennas, wherein each antenna generates a received signal from said radio signal;

a beamforming device for defining beams, using said received signals, which cover a cell supported by said base station;

an estimating device for estimating parameters associated with said beams;

a selection device for selecting at least two signal processing branches based on said estimated parameters, wherein the selection device selects a first number of signal processing branches based on one of the estimated parameters, and wherein the signal selection device then selects a smaller number of signal processing branches from the first number of signal processing branches based on another of the estimated parameters;

a receiver for combining information provided by said at least two selected signal processing branches to generate detected information symbols, said receiver including an impairment correlation unit which estimates a correlation between impairment associated with one of said at least two selected signal processing branches and impairment associated with another of said at least two selected signal processing branches and which uses said correlation estimate to combine at least two said received signals; and a second antenna array for providing diversity reception, wherein said selection device selects a same number of branches associated with said antenna array and said second antenna array.

2. The base station of claim 1, wherein said selection device includes a memory for storing information including previous estimated parameters and selections and wherein said selection device uses said stored information to select said at least one signal processing branch.

3. The base station of claim 1, wherein said antenna array and said second antenna array use polarization diversity.

4. The base station of claim 1, wherein said antenna array and said second antenna array are spatially separated to obtain spatial diversity.

5. The base station of claim 1, wherein said beamforming device operates on said received signals at radio frequency.

6. The base station of claim 1, wherein said beamforming device operates on said received signals at baseband.

7. In a telecommunications system, a base station comprising:

an antenna array for receiving a radio signal transmitted from a mobile station, wherein said antenna array includes a plurality of antenna elements;

a fixed beamforming device coupled to said antenna array, wherein said fixed beamforming device receives each of a number of antenna signals from a corresponding one of said antenna elements, and wherein said fixed beamforming device combines the antenna signals to form a number of beams covering a cell in which the base station is operating;

a signal quality estimation unit receiving a signal associated with each beam, and deriving therefrom, a plurality of signal quality measurements for each beam signal;

a signal selection unit for selecting one or more of the beam signals based on one or more of the plurality of signal quality measurement associated with all of the beam signals, wherein the signal selection unit selects a first number of beam signals based on one of the signal quality measurements, and wherein the signal selection unit then selects a smaller number of beam signals based on another of the signal quality measurements; and a symbol detection unit receiving the one or more selected beam signals and detecting a sequence of symbols associated with the radio signal received from the mobile station.

8. The base station of claim 7 further comprising:

a second antenna array for receiving the radio signal transmitted from the mobile station, wherein the second antenna array includes a second plurality of antenna elements;

a second beamforming device coupled to said second antenna array, wherein said second fixed beamforming device receives each of a second plurality of antenna signals from a corresponding one of said second plurality of antenna elements, and wherein said second fixed beamforming device combines the second plurality of antenna signals to form a second number of beams covering the cell; and a signal quality estimation unit receiving a signal associated with each of the second number of beams, and deriving therefrom, at least one signal quality measurement for each of the second number of beam signals, said signal selection unit selecting one or more of the second beam signals based on the signal quality measurement associated with each of the second number of beam signals.

9. The base station of claim 8, wherein said first and second antenna array together provide diversity reception.

10. The base station of claim 9, wherein said first and second antenna array are spatially separated from each other, and wherein said base station employs spatial diversity.

11. The base station of claim 9, wherein said base station employs polarization diversity.

12. The base station of claim 7, wherein the number of beams formed by said fixed beamforming device is less than the number of antenna signals received by said fixed beamforming device.

13. The base station of claim 7 further comprising:

a radio receiver for receiving the signals associated with each of the beams formed by said fixed beamforming device and converting the signals from a radio frequency to a baseband frequency, wherein the signals received by the signal quality estimation unit are at a baseband frequency.

14. The base station of claim 7, wherein said signal quality estimation unit comprises:

means for deriving at least one signal quality measurement for each beam signal.

15. The base station of claim 14, wherein said signal quality estimation unit further comprises:

means for locating a training sequence.

16. The base station of claim 14, wherein said signal quality estimation unit further comprises:

means for estimating a channel impulse response.

17. The base station of claim 14, wherein the signal quality measurement is signal strength measurement.

18. The base station of claim 14, wherein the signal quality measurement is signal strength to interference ratio measurement.

19. The base station of claim 7, wherein the number of beam signals selected by said signal selection unit is less than the number of beams formed by said fixed beamforming device.

20. The base station of claim 7, wherein said symbol detection unit comprises:

a noise estimator; and an interference rejection detector.

21. The base station of claim 20, wherein said interference rejection detector comprises:

means for applying an inverse noise cross-correlation matrix to the sequence of symbols associated with the radio signal received from the mobile station.

22. The base station of claim 20, wherein said noise estimator comprises:

means for deriving a noise cross-correlation matrix.

23. The base station of claim 22, wherein said interference rejection detector comprises:

means for applying an inverse noise cross-correlation matrix to the sequence of symbols associated with the radio signal received from the mobile station.

24. The base station of claim 20, wherein said symbol detection unit is a multidimensional maximum likelihood sequence estimation based symbol detection unit.

25. In a base station of a telecommunications system, a method for detecting information symbols associated with a received radio signal, said method comprising the steps of:

receiving an uplink radio signal using an antenna array which includes at least two antennas, wherein each antenna generates a received signal from the uplink radio signal;

defining beams using the received signals, wherein the beams cover a cell supported by the base station;

estimating parameters associated with each of the beams;

selecting at least two signal processing branches based on the estimated parameters associated with each of the beams, wherein the selecting step comprises selecting a first number of signal processing branches based on one of the estimated parameters, and selecting a smaller number of the signal processing branches from the first number of signal processing branches based on another of the estimated parameters; and combining information provided by the at least two selected signal processing branches to generate detected information symbols, wherein said step of combining includes estimating a correlation between impairment associated with one of the at least two selected signal processing branches and impairment associated with another of the at least two selected signal processing branches and using the correlation estimate to combine at least two received signals.

26. The method of claim 25, wherein said step of selecting at least two signal processing branches based on the estimated parameters associated with each of the beams comprises the step of:

storing information including previous estimated parameters and selections, and selecting a signal processing branch based on the stored information.

27. The method of claim 25, wherein said step of receiving the uplink radio signal using an antenna array which includes at least two antennas comprises the step of:

receiving the uplink radio signal by employing diversity reception.

28. The method of claim 27, wherein diversity reception involves polarization diversity.

29. The base station of claim 27, wherein diversity reception involves spatial diversity.

30. The method of claim 25, wherein the received signals used to define the beams are at a radio frequency.

31. The method of claim 25, wherein the received signals used to define the beams are at a baseband frequency.

32. The method of claim 25 further comprising the step of:

ordering the beams based on the estimated parameters associated with each of the beams.

33. The method of claim 32, wherein said step of ordering the beams based on the estimated parameters associated with each of the beams comprises the step of:

ranking the beams based on a signal strength measurement associated with each of the beams.

34. The method of claim 32, wherein said step of ordering the beams based on the estimated parameters associated with each of the beams comprises the step of:

ranking the beams based on a signal-to-interference ratio measurement associated with each of the beams.

\* \* \* \* \*